United States Patent
Scarborough

[15] 3,682,423
[45] Aug. 1, 1972

[54] RETRACTABLE TWIST LOCK
[72] Inventor: Philip H. Scarborough, Elba, Ala. 36323
[22] Filed: Aug. 19, 1970
[21] Appl. No.: 65,118

[52] U.S. Cl....................................248/119, 248/361
[51] Int. Cl................................................F16b 17/00
[58] Field of Search ...248/119 R, 361 R; 105/366 A, 105/366 B, 366 C; 296/35 A

[56] References Cited

UNITED STATES PATENTS

| | | | |
|---|---|---|---|
| 3,521,845 | 7/1970 | Sweda | 248/361 R X |
| 3,486,787 | 12/1969 | Campbell | 248/361 R X |
| 3,102,708 | 9/1963 | Crain | 248/361 |
| 3,556,458 | 1/1971 | Erith | 248/361 |
| 3,438,671 | 4/1969 | Seng | 248/361 R X |

Primary Examiner—Chancellor E. Harris
Attorney—Joseph Weingarten

[57] ABSTRACT

A retractable twist lock for coupling a cargo container to a platform or chassis. The twist lock is adapted when in one position to secure containers having corner fittings constructed to cooperate with the twist lock, and when in a second position to be retracted below the platform surface to enable the thereby unencumbered platform to be used for other purposes.

20 Claims, 5 Drawing Figures

PATENTED AUG 8 1972 3,682,423

INVENTOR
PHILIP H. SCARBOROUGH
BY Joseph Weingarten
Lawrence A. Maxham
ATTORNEYS

RETRACTABLE TWIST LOCK

FIELD OF THE INVENTION

This invention relates in general to coupling devices and more particularly concerns a novel retractable twist lock for securing cargo containers to transportation vehicle platforms such as truck bodies, chassis, semi-trailers, railroad cars and ship or barge decks or platforms.

DISCUSSION OF THE PRIOR ART

In recent years the transportation industry has been substantially affected by the containerization concept whereby a major portion of both domestic and international shipping is done through the use of large containers. These containers facilitate handling of cargo such as bulk goods not otherwise secured together. This method of shipping goods involves the use of a set of standardized container "modules" which may be detachably connected by means of standardized corner fittings to various transportation vehicles. Such containers are most commonly seen mounted on chassis for rail and over-the-road transportation from which they may easily be detached for further travel in appropriate air or water transportation means. Such containers are generally formed of relatively light weight metal panels mounted on frames having corner fittings adapted to facilitate stacking in the cargo holds of ships and to also enable them to be secured to other types of platforms by clamping means of conventional structure.

It is often desirable to use truck chassis or other transportation platforms for purposes other than securing shipping containers thereto. Furthermore, containers have different modular sizes and often several of the clamping devices on a platform have no use for securing a particular container. For this reason it is desirable that clamping means such as twist locks which are widely used to secure a container to a platform be adapted to be removed from the platform surface in some manner so that the platform is not encumbered with such obstructions and so that such securing devices will not interfere with different uses for the vehicle platform where these devices are not necessary or useful.

Containers may be any practical length and are generally made in 10-foot multiples ranging from 10 feet to 40 feet long. Several containers may be grouped in end-to-end relation on any one chassis so it is necessary that the chassis be provided with the number of locking devices required to accommodate the largest possible number of containers. In the case of a 40-foot chassis, it is necessary to provide sufficient locking devices to handle four 10-foot container units. Employing the normal configuration of a locking means for each corner of the containers, such a chassis would need eight such locks on each side. However, in order to secure two 20-foot containers, only four locking devices are necessary on each side of the chassis. It is also possible that the same chassis may be used at another time to secure a single 40-foot container whereby all of the locking devices except those on the corners would be unnecessary. In either example where less than all of the twist locks are needed, the unnecessary intermediate sets of locking devices should in some way be removable from the surface of the platform or chassis so that they do not interfere with the bottom side rails of the container.

SUMMARY OF THE INVENTION

This invention is directed to a device for providing a simple, easily operated, and effective locking device of the twist lock type which is readily retractable when not employed to secure a container to its platform. The term "platform" will be used herein to designate any type of platform or chassis on which containers may be secured for some mode of transportation. With this novel structure, twist locks which are not used when the chassis is loaded with containers are easily retracted so that they do not project upward into the plane of the platform, and therefore do not in any way interfere with the use of the platform. This retractable twist lock is rugged and yet simple to operate, having few moving parts. The lock is constructed in such a way that contamination, such as corrosion, dirt, mud or ice, often encountered in extended road use, will generally not adversely affect its operation.

BRIEF DESCRIPTION OF THE DRAWING

The invention and the features and advantages thereof will become apparent from the following detailed description taken in conjunction with the accompanying drawing, in which.

DESCRIPTION OF THE PREFERRED EMBODIMENTS

Figure 1:
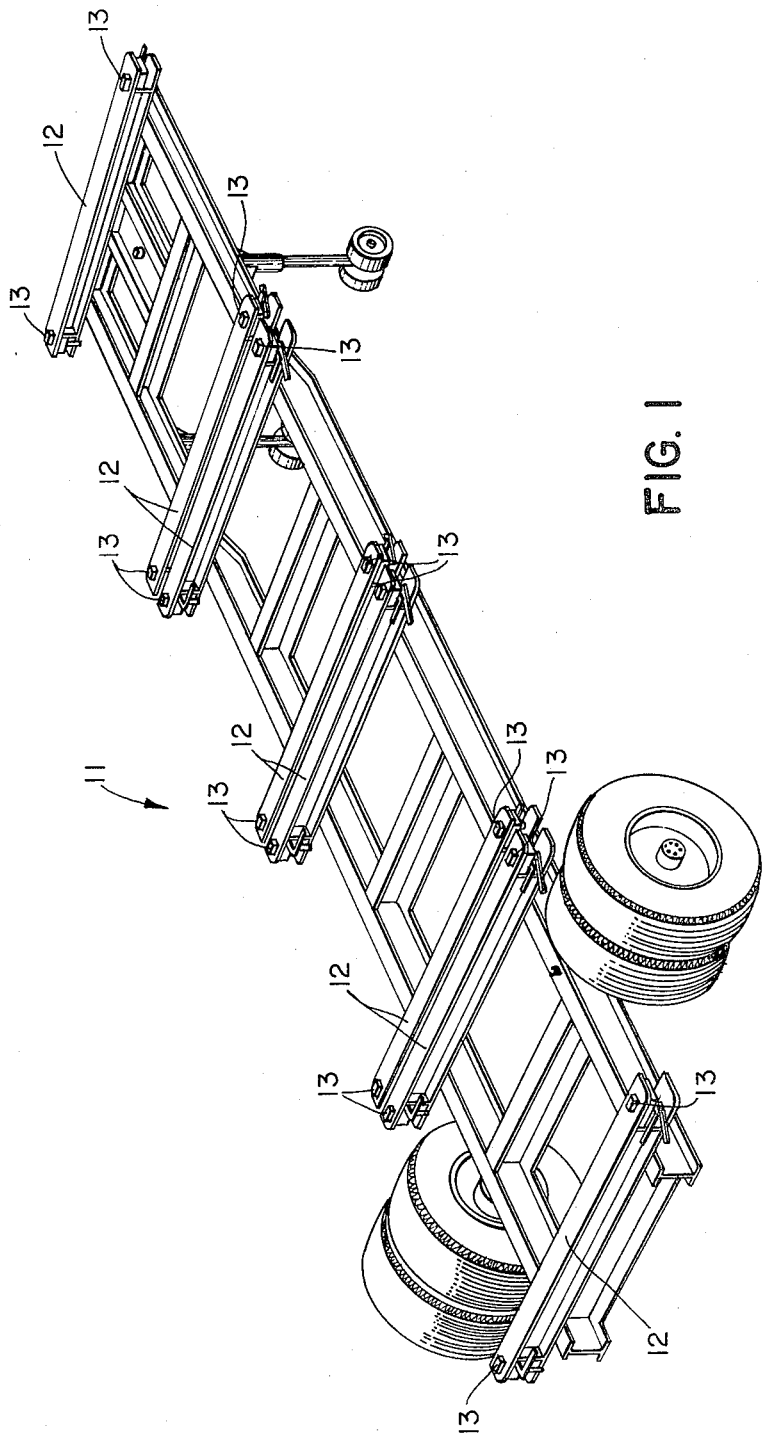
FIG. 1 is a perspective view of a semi-trailer chassis having several of the retractable twist locks of this invention mounted thereon.

The retractable twist lock of this invention is shown in the drawing as a part of a semi-trailer chassis to be used in over-the-road transportation. It is to be understood that this invention is equally adapted for use on all types of transportation chassis and platforms including railroad cars, ships, barges and airplanes. The principles of the invention apply equally to all such transportation vehicles and this locking device may be mounted in any position on any of the various platforms.

With reference now to the drawing, FIG. 1 shows a chassis 11 fitted with several bolsters 12, each bolster having a retractable twist lock 13 at each end thereof constructed in accordance with this invention. Chassis 11 may be of any conventional type and has suitable framework to meet the purposes for which it is constructed. The chassis is shown here in simplified form, further details thereof being unnecessary to the explanation of this invention. The intermediate bolsters are constructed on the chassis in pairs in order to accommodate the maximum number of the smaller size containers as previously discussed.

Figure 2:
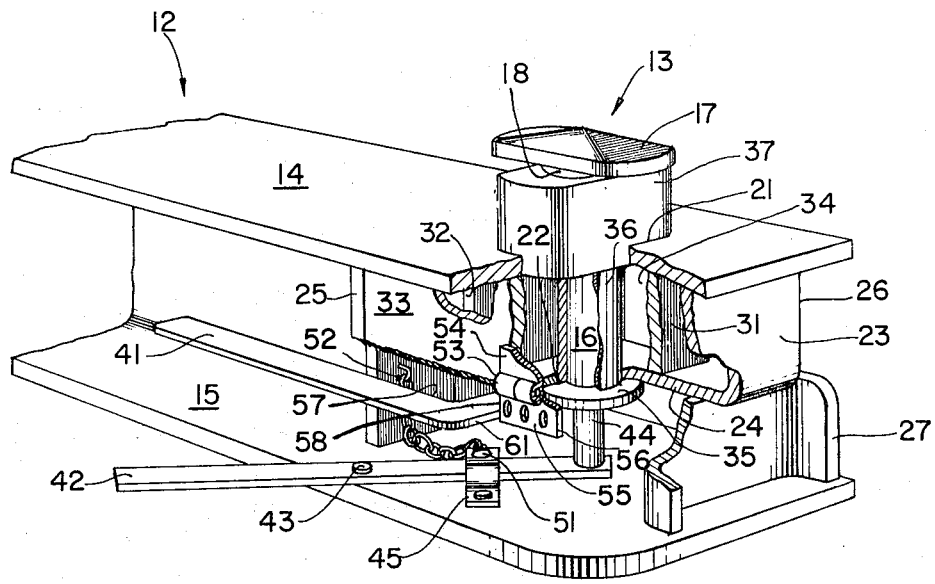
FIG. 2 is a partially broken away, enlarged perspective view of a retractable twist lock and a portion of its bolster as depicted in FIG. 1, the twist lock being shown in operative and locked position.
Figure 3:
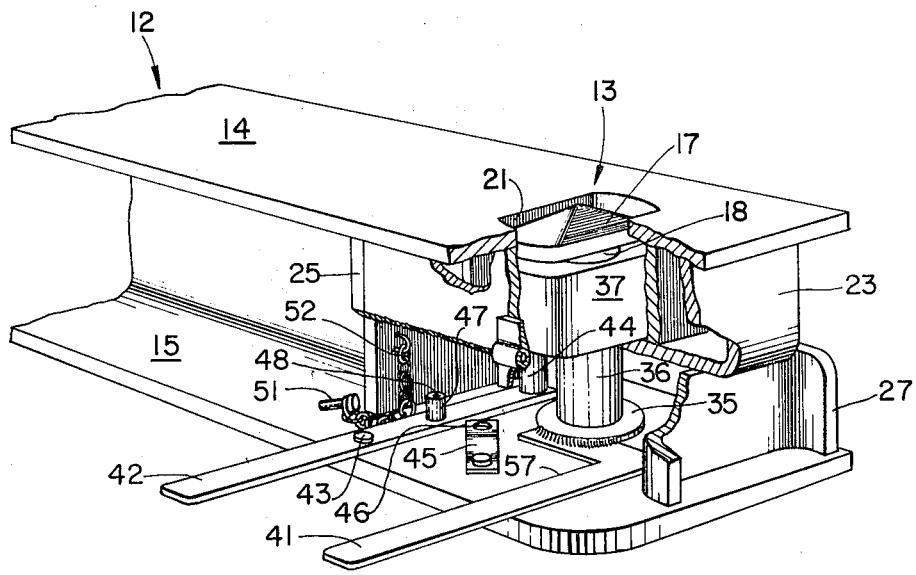
FIG. 3 is the retractable twist lock of FIG. 2 shown in retracted position.

Twist lock 13 is shown in full detail in FIGS. 2 and 3 and comprises a relatively box shaped structure or frame on the end of the bolster, with operative members extending from the structure as will be presently explained. One end of top flange 14 and bottom flange 15 of bolster 12 form the upper plate and base plate respectively of the frame of twist lock 13. The locking member comprises a cylindrical shank 16 and an enlarged head 17 having a smaller circular flange 18. Elongated opening 21 in flange 14 is shaped similarly to head 17. The locking member extends through opening 21 and through circular opening 22 in L-shaped bracket 23. Bracket 23 has a horizontal portion 24 parallel to bolster flanges 14 and 15 which is secured to cap plate 25, and a vertical portion 26 secured to the underside of flange 14. Gusset 27 is secured between bracket 23 and the upper side of flange 15 adjacent the end of the bolster. A rectangular cavity is formed between flange 14 and bracket 23 by outer gusset 31, inner gusset 32, front plate 33 and rear plate 34.

Secured to shank 16 adjacent but preferably slightly above the lower end thereof is retaining washer 35. Shear block support 36 is a cylindrical sleeve surrounding shank 16 above washer 35 and extends toward head 17. Shear block 37 surrounds the remaining length of shank 16 between sleeve 36 and head 17. The head includes circular flange 18 which is larger than the bore through shear block 37 so that the main portion of head 17 is displaced from and can rotate freely with respect to the shear block. The sleeve serves to maintain the position of shear block 37 on the shank adjacent head 17. The depth of the cavity is equal to or slightly greater than the combined height of shear block 37 and head 17 for purposes which will become evident. Positioning member 41 is secured to the underside of washer 35, the thickness of the member being substantially equal to the length of shank 16 extending through the washer. Thus, when the twist lock is in retracted position as shown in FIG. 3, the end of the shank and the bottom surface of the positioning member rest upon flange 15. It should be noted that when in this position shear block 37 and head 17 are both within the cavity and no part of the head extends above the plane of the top of flange 14.

Spacer arm 42 is pivotally connected to flange 15 by means of pivot pin 43. Spacer block 44 is secured to the inner end of this arm. The spacer block may be of any desired shaped but its length should be substantially equal to the length of sleeve 36 which, in turn, is substantially equal to the combined height of shear block 37 and head 17.

When it is desired to move the twist lock from the retracted position of FIG. 3 to the operative position of FIG. 2, positioning member 41 is grasped and lifted upward to raise the locking member and shear block. Arm 42 is then pivoted so that spacer block 44 is positioned directly beneath shank 16. Head 17 and shear block 37 thus extend through opening 21 and the twist lock is in operative position, ready to engage a corner fitting of a container. Such corner fittings are conventional and have an opening of substantially the same shape as the shear block and the head, with a bottom thickness equivalent to the distance between the top of flange 14 and the bottom of the main enlarged portion of head 17. When the corner fitting is properly positioned over the twist lock, member 41 is rotated 90° so that head 17 firmly engages the inner surface of the corner fitting, which parallels flange 14.

To ensure that spacer block 44 remains in the position shown in FIG. 2, bracket 45 is provided. This is a modified Z-shaped member having one horizontal portion secured to flange 15, the other horizontal portion having a hole 46 through it. Arm 42 is provided with an elongated member 47 having a longitudinal opening 48 therein. Member 47 may have any suitable shape and is shown here as a tube. Pin 51 which is flexibly secured to cap plate 25 by suitable means such as chain 52 may be inserted through hole 46 into opening 48 so that arm 42 is prevented from moving accidentally or unintentionally when the twist lock is in operative position.

Stop member 53 is essentially a hinge having one side 54 secured to front plate 33, the other side 55 being free to swing, normally hanging downward due to the force of gravity. When the locking member is first raised from the position shown in FIG. 3 to its operative position, twist lock 13 is in unlocked condition. This is neccessarily true because head 17 must be aligned with shear block 37 when retracted into the cavity. The outer edge 56 of side 55 of the stop member then contacts inner edge 57 of member 41 and prevents its unintentional rotation to the left as viewed in the drawing. Gusset 27 prevents misalignment of head 17 by preventing rotation of member 41 to the right. When it is desired to rotate the locking member 90° to its position, side 55 of the stop member is manually swung upward to clear member 41 and thereby permit it to be rotated to the position shown in FIG. 2. Side 55 is then allowed to drop downward so that its inner edge 58 abuts edge 61 of handle 41, thereby preventing its unintentional rotation to the right. The edge of cap plate 25 prevents further rotation to the left.

When it is desired to retract the locking member, the twist lock must be in its unlocked position. Pin 51 is removed from bracket 45 and arm 42 is then simply pivoted away from the bracket to remove spacer block 44 from beneath shank 16, thereby permitting the locking member and shear block to drop into the cavity and clear of the top of the bolster.

Figure 4:
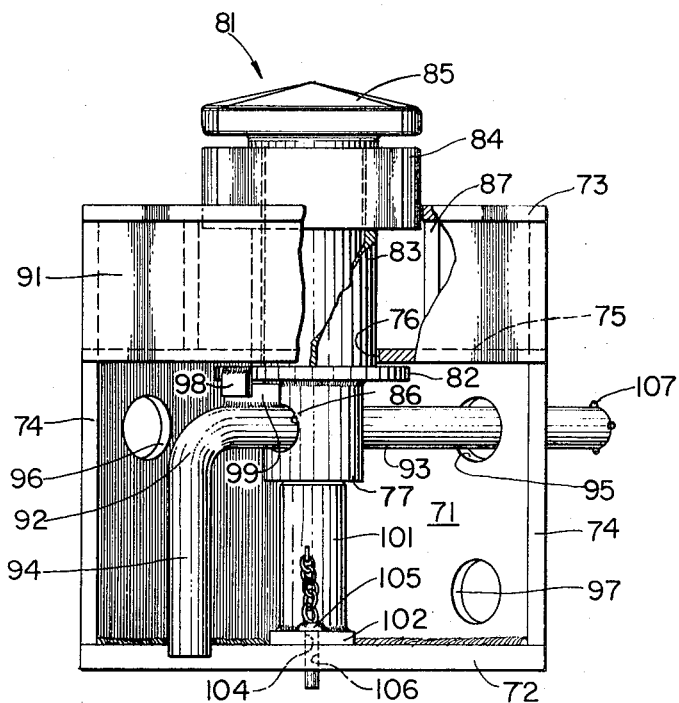
FIG. 4 shows a partially broken away elevational view of an alternative embodiment of the twist lock of this invention adapted for use on flat-bed platforms, shown in operative position.
Figure 5:
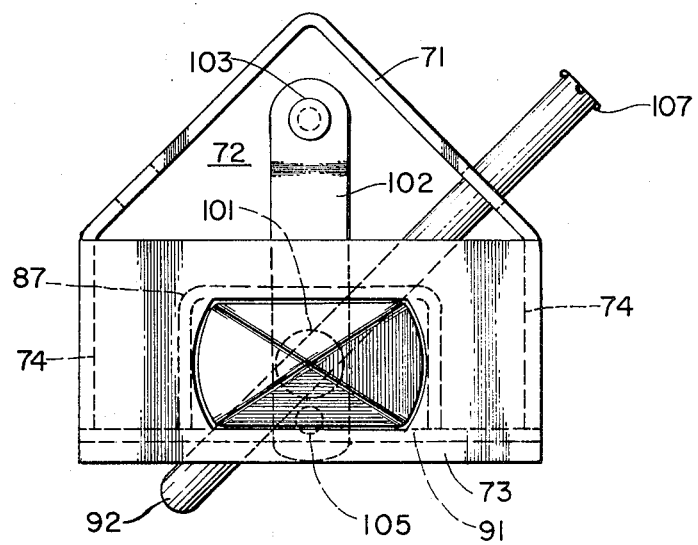
FIG. 5 is a top view of the twist lock of FIG. 4.

With reference now to FIGS. 4 and 5, there is shown a modified embodiment of this invention wherein the twist lock is adapted to be a part of a flat-bed platform. This embodiment employs the same inventive principles as previously described in conjunction with the twist lock used on chassis. Because flat-beds do normally not have bolsters, the twist lock structure has been modified so that it opens toward the side of the platform and can be operated from that position. The twist lock structure, presently to be described, may be installed as a unit into the side rail of the flat-bed by suitable means such as by welding.

The frame of this embodiment comprises a generally V-shaped housing 71 secured to base plate 72 and upper plate 73. Between the parallel sides 74 of housing 71 at a point substantially below upper plate 73 is gusset 75. This gusset has a hole 76 therein through which shank 77 of locking member 81 extends. As in the previously described embodiment, a retaining washer 82 is secured to shank 77, while shear clock support 83 and shear block 84 surround substantially the entire length of the shank between the retaining washer and head hear 85. A rectangular cavity is formed between gusset 75 and plate 73 by U-shaped gusset 87 and front plate 91. It is into this cavity that shear block 84 and head 85 retract to enable unencumbered use of the platform surface. The top surface of the platform (not shown) is in substantially the same plane as the top of plate 73 and when the twist locks are all retracted, a relatively flat surface is available for any desired use. When the twist locks are in operative position, as shown in FIG. 4, the platform is adapted to carry one or more containers in substantially the same way as chassis 11 shown in FIG. 1.

Twist lock positioning member 92 corresponds in function to member 41 of the embodiment shown in FIGS. 2 and 3. This member is an L-shaped rod having a horizontal portion 93 which is slidably mounted through bore 86 in shank 77, and a handle portion 94 by which the positioning member is manually operated. By swinging member 92 either left or right so as to rotate shank 77, locking member 81 is rotated between its locking and unlocking position. Housing 71 is provided with openings 95, 96 and 97 for the following purposes: (a) when the twist lock is in its operative but unlocked position, as shown in FIG. 4, the distal end of member 92 extends through opening 95 to prevent head 85 from rotating; (b) when the twist lock is in its operative and locked position, the distal end of member 92 extends through openings 96; and (c) when the twist lock is in its inoperative or retracted position, the distal end of member 92 extends through opening 97 in order to maintain the members of the twist lock in secured condition. Stop member 98 is secured to retaining washer 82 generally aligned with bore 86 in shank 77 while another stop member 99 is secured to member 92 on the side of horizontal portion 93 which is opposite to handle portion 94. The function of these members will be explained presently.

Spacer block 101 is secured to spacer arm 102 at a location inwardly spaced from its outer end. The inner end of arm 102 is pivoted about suitable pivot means 103 and has a hole 104 therethrough adjacent its outer end. A pin 105, flexibly secured to block 101 by suitable means such as a chain, is adapted to pass through hole 104 and a registering hole 106 in base plate 72 for purposes of maintaining block 101 centered beneath shank 77 when the twist lock is in operative position.

Having set forth the structure of the twist lock embodiment of FIGS. 4 and 5, its operation will now be discussed in detail. From the operative-unlocked position of the drawing, the lock may be moved to the locking position by first rotating member 92 by means of handle portion 94 so that stop members 98 and 99 become disengaged, then pulling member 92 so that its distal end is removed from opening 95. Member 92 is prevented from being removed from shank 77 by projections 107 which may be beads of welding material, or the end of member 92 may be headed over. It may be noted that openings 95, 96, and 97 are substantially larger than bore 86 so that member 92 may easily be inserted into and removed from these openings. Member 92 is then swung to the right by about 90° as viewed in FIG. 4 and pushed inward so that the distal end of horizontal portion 92 extends through opening 96 in housing 71. Head 85 is now in its locking position, corresponding to the position shown in FIG. 2. By rotating handle 94 downward to a position similar to that of FIG. 4, stop members 98 and 99 again become engaged so that member 92 cannot be unintentionally removed from opening 96. The force of gravity will tend to keep handle 94 pointing downward, thereby maintaining the stop members in engaged positions.

When it is desired to retract the locking member, handle 94 is rotated to disengage the stop members and is pulled to remove member 92 from opening 96. Handle 94 is then swung to the left to rotate head 85 to unlocked position. Pin 105 is removed from hole 106 in plate 72 and arm 102 is rotated so that block 101 is removed from beneath shank 77 and shank, head, shear block and shear block support are allowed to drop downward to retracted position. Shear block 84 and head 85 are then located within the cavity above gusset 75, leaving the top of the platform unencumbered. Member 92 is then pushed inward so that it passes through opening 97 and rotated downward to again engage the stop members. To return the twist lock to operative condition, the reverse procedure is followed.

Although the twist lick of this embodiment is shown as a single unit which may be mounted in the side of a flat-bed, it is possible that a double unit may be constructed for mounting to the platform so that there will be two locks together, similar to the chassis embodiment of FIG. 1. Also the structures for the corners of the flat-bed may be somewhat modified but such changes would be only in the shape of various members. The corner twist locks would function identically to that described below.

It is thus evident that by means of a simple but extremely rugged and easy-to-operate mechanism, the twist lock of this invention may be changed from either its operative or its retracted position to the other position as desired through minimum effort on the part of the operator, thereby permitting the platform upon which such twist locks are installed to be used for any container of modular dimensions without the necessity of dismantling or otherwise removing portions of the mounted twist locks. It should be noted that the cavity which accepts the shear block and head is rectangularly shaped so that neither of these elements may be rotated while the twist lock is in retracted position. In this way, there is no tendency toward binding of the head or spacer block while in the retracted position, and it is always free to be changed to a different position. By preventing rotation of these elements while in the retracted position, the twist lock may be moved to its operative position by simply lifting up on member 41 (or member 92) and raising the assembly so that the head and shear block extend through the opening in the upper plate.

It is evident that many changes and modifications will likely occur to those skilled in the art which are within the scope of this invention. For example, instead of using a pin extending through a hole to maintain the spacer arm in position, a simple latch device which is manually releasable would suffice. Likewise, a similar latching type device may be used in place of hinge 53 of the embodiment of FIGS. 2 and 3. The simple but rugged nature of this twist lock recommends itself highly to the containerization portion of the transportation industry. Many twist locks are either not easily operable or are sufficiently complicated such that road grime or ice could easily make them inoperative. The present device will generally not be affected by such difficulties.

What is claimed is:

1. A retractable twist lock for securing a container to a platform, said twist lock comprising:
   a frame secured to said platform, said frame including a cavity, the top of said frame being substantially coplanar with the surface of said platform;
   a locking member rotatably mounted in said frame, said locking member being longitudinally movable between a first position and a second position; and
   spacer means pivotally mounted to said frame independent of said locking member, said locking member being engageable by said spacer means when in said first position and said spacer means being pivoted away from engagement with said locking member when said locking member is in said second position;
   said locking member, when in said first position extending above said platform surface and being operative to secure a container to said platform, and when in said second position being within said cavity below the surface of said platform and inoperative to secure a container to said platform.

2. The retractable twist lock according to claim 1 wherein:
   said frame includes upper and base plates and an intermediate plate, said plates being substantially parallel to one another, said upper plate having an elongated opening therethrough, said intermediate plate having a substantially circular opening therethrough;
   said locking member is formed with an elongated, substantially cylindrical shank and a relatively flat enlarged head at one end thereof, said head extending above said upper plate when said locking member is in said first position, said shank extending through said opening in said intermediate plate;
   said head being shaped to pass through said opening in said upper plate when said locking member is moved from said first position to said second position.

3. The retractable twist lock according to claim 2 and further comprising:
   retaining means secured to and surrounding said shank adjacent the other end thereof;
   a cylindrical sleeve enclosing a portion of said shank and extending from said retaining means toward said head; and
   a shear block enclosing substantially the remaining portion of said shank between said sleeve and said head; wherein:
   said other end of said shank and said retaining means are located between said base plate and said intermediate plate, said retaining means preventing said locking member from rising above said first position;
   said sleeve extends through said opening in said intermediate member;
   said shear block is shaped to extend through said opening in said upper plate when said locking member is in said first position.

4. The retractable twist lock according to claim 3 wherein said spacer means comprises:
   an arm pivotally mounted to said base plate; and
   a spacer block secured to said arm;
   said arm being pivotable between an engaging position, whereby said spacer block engages said locking member to maintain said locking member in said first position, and a retracted position, whereby said spacer block and said locking member are separated, said locking member thereby being permitted to be moved to said second position.

5. The retractable twist lock according to claim 2 and further comprising:
   a positioning member coupled to said locking member and adapted to rotate said locking member between locking and unlocking positions when manually pivoted through a plane parallel to said plates; and
   means cooperative with said positioning member to selectively maintain said locking member in said locking and unlocking positions.

6. The retractable twist lock according to claim 3, wherein said cavity is shaped to accept said shear block and said head when said locking member is in said second position, said cavity generally conforming to the size and shape of said shear block and head so that said shear block and head are prevented from rotating and are below the surface of said platform when said locking member is in said second position.

7. The retractable twist lock according to claim 4 wherein:
   said spacer block projects above said base plate a distance which is substantially equal to the distance by which said head extends above said upper plate when said locking member is in said first position.

8. The retractable twist lock according to claim 4, said spacer means further comprising:
   an elongated member mounted to said arm and having its longitudinal axis perpendicular thereto, said elongated member having an axial bore therein;
   a bracket secured to said base plate and having a portion substantially horizontal to and spaced from said base plate, said horizontal portion having an opening therein; and
   a pin flexible secured to said frame and shaped to fit through said opening in said bracket and into said bore in said elongated member;
   said bore in said elongated member being capable of being aligned with said opening in said bracket so that said arm and said bracket may be secured together by said pin when said arm is in said engaging position;
   said bracket further acting as a stop means to prevent said arm from pivoting in one direction beyond said engaging position.

9. The retractable twist lock according to claim 5, wherein said cooperative means comprises a hinge having a pivotable portion, said pivotable portion when in said normal position abutting one edge of said positioning member when said locking member is in said locking position and abutting another edge of said positioning member when said locking member is in said unlocking position.

10. The retractable twist lock according to claim 9, wherein said cooperative means further includes portions of said frame which abut the edge of said positioning member opposite to the edge abutted by said hinge so that said positioning member is prevented from unintended rotation in either direction when in either locking or unlocking position.

11. The retractable twist lock according to claim 4, said spacer means further comprising:
a pin flexibly secured to said spacer block, wherein:
said base plate is provided with an opening configured to receive one end of said pin;
said arm is provided with a hole adjacent its outer end configured to receive said one end of said pin, said hole being adapted to be aligned with said opening in said base plate so that said arm may be held in said engaging position by inserting said pin through said hole and said opening simultaneously.

12. The retractable twist lock according to claim 3 wherein:
said retaining means comprises a washer;
said twist lock further comprising a positioning member secured to the underside of said washer, said shank extending through said washer by a distance substantially equal to the thickness of said positioning member, the underside of said positioning member being substantially coplanar with said other end of said shank.

13. The retractable twist lock according to claim 4 and further comprising:
an elongated positioning member slidably and rotatably coupled to said shank and adapted to rotate said locking member between locking and unlocking positions when manually pivoted through a plane parallel to said plates; and
a housing member having a plurality of openings therein;
the distal end of said positioning member being selectively adapted to extend into said openings in said housing to thereby maintain said locking member at a desired angular position.

14. The retractable twist lock according to claim 13 and further comprising:
stop means cooperating with said retaining means and said positioning member to prevent unintended removal of said positioning member from said openings in said housing.

15. The retractable twist lock according to claim 14 wherein said stop means comprises a first stop member secured to said retaining means and a second stop member secured to said positioning member, said stop members being in mutual engagement to prevent removal of said positioning member from said openings in said housing when said positioning member is in a predetermined angular position, said stop members being disengaged when said positioning member is rotated substantially away from said predetermined angular position.

16. The retractable twist lock according to claim 15 wherein said positioning member being adapted to extend through a first of said openings in said housing when said locking member is in said unlocking position, said positioning member being adapted to extend through a second of said openings when said locking member is in said locking position, and said positioning member being adapted to extend through a third of said openings when said locking member is in said second position.

17. The retractable twist lock according to claim 13, wherein said other end of said shank is formed with a bore therethrough substantially perpendicular to the longitudinal axis of said shank, said bore being on the opposite side of said retaining means from said head, said positioning member being coupled to said shank by extending through said bore, said bore being sufficiently larger than the cross section of said positioning member to permit free sliding and rotation thereof in said bore, the distal end of said positioning member being formed with enlargements to prevent removal of said positioning member from said bore.

18. A retractable twist lock for securing a container to a platform, said twist lock comprising:
a frame secured to said platform, said frame including a cavity;
a locking member rotatably mounted to said frame, said locking member being longitudinally movable between a first position and a second position;
spacer means pivotally mounted to said frame independent of said locking member and including an arm pivotally mounted to said frame and a spacer block secured to said arm, said locking member when in said first position being engageable by said spacer block to maintain said locking member in said first position and when said spacer block is pivoted away from engagement with said locking member, said locking member assumes said second position;
said locking member, when in said first position, extending above the surface of said platform and being operative to secure a container to said platform, and when in said second position being within said cavity below the surface of said platform and inoperative to secure a container thereto.

19. A retractable twist lock for securing a container to a platform, said twist lock comprising:
a frame secured to said platform, said frame including a cavity;
a locking member rotatably mounted in said frame, said locking member being longitudinally movable between a first position and a second position;
spacer means pivotally mounted to said frame independent of said locking member, said locking member being engageable by said spacer means when in said first position and said spacer means being pivoted away from engagement with said locking member when said locking member is in said second position;
a positioning member secured to said locking member for rotating said locking member between locking and unlocking positions; and
means mounted to said frame cooperative with said positioning member to selectively maintain said locking member in said locking and unlocking positions;
said locking member, when in said first position, extending above the plane of said platform and being operative to secure a container to said platform, and when in said second position being within said cavity below the surface of said platform and inoperative to secure a container thereto.

20. The retractable twist lock according to claim 19 wherein said locking member is formed with an elongated, substantially cylindrical shank and a relatively flat enlarged head at one end thereof, said retractable twist lock further comprising: locking
an elongated positioning member slidably and rotatably coupled to said shank and adapted to rotate said locking member between locking and unlocking positions, the walls of said cavity having a plurality of openings therein, the distal end of said positioning member being selectively adapted to extend into said openings in said cavity walls to thereby maintain said lock member at a desired angular position.

* * * * *

UNITED STATES PATENT OFFICE
CERTIFICATE OF CORRECTION

Patent No. 3,682,423    Dated  August 8, 1972

Inventor(s)  Philip H. Scarborough

It is certified that error appears in the above-identified patent and that said Letters Patent are hereby corrected as shown below:

Title page, insert
   --Assignee: Dorsey Trailers, Inc.
                Elba, Alabama--

Column 4, line 32, after "its" insert --locking--;
         line 67, "clock" should read --block--.

Column 5, line 3, "head hear" should read --enlarged head--.

Column 6, line 26, "lick" should read --lock--;
         line 35, "below" should read --hereinabove--.

Column 8, line 52, "flexible" should read --flexibly--.

Column 11, line 9, delete "locking".

Column 12, line 7, "lock" should read --locking--.

Signed and sealed this 8th day of May 1973.

(SEAL)
Attest:

EDWARD M. FLETCHER, JR.            ROBERT GOTTSCHALK
Attesting Officer                  Commissioner of Patents